United States Patent [19]
Butow et al.

[11] Patent Number: 5,722,388
[45] Date of Patent: Mar. 3, 1998

[54] GRILL-UNIT USED MAINLY WITH CHARCOAL BURNING

[76] Inventors: Klaus-Dieter Butow, Leinenweberstr. 14, D-79110 Freiburg; Elke Petra, Lärchenstr. 28, D-85646 Anzing, both of Germany

[21] Appl. No.: 638,760

[22] Filed: Apr. 29, 1996

[30] Foreign Application Priority Data

Apr. 28, 1995 [DE] Germany .......................... 195 15 080.5

[51] Int. Cl.$^6$ ............................................. F24B 3/00
[52] U.S. Cl. .................................... 126/25 R; 99/444
[58] Field of Search ........................... 126/25 R; 99/444

[56] References Cited

U.S. PATENT DOCUMENTS

| | | |
|---|---|---|
| 3,079,909 | 3/1963 | Bemben . |
| 3,809,051 | 5/1974 | Giroux ................................. 126/25 R |
| 4,624,238 | 11/1986 | Hait ..................................... 126/25 R |

FOREIGN PATENT DOCUMENTS

| | | |
|---|---|---|
| 132 050 | 8/1978 | Germany . |
| 85 27 176.4 | 3/1986 | Germany . |
| 92 11 925.5 | 1/1993 | Germany . |

*Primary Examiner*—Carroll B. Dority
*Attorney, Agent, or Firm*—Cohen, Pontani, Lieberman & Pavane

[57] ABSTRACT

A Grill-Unit is described, preferably for charcoal burning, with a coal duct with a vertical U cross sectional form and lateral air vents, a grease trap tray inserted into the ducts' outer walls, with tapering guide walls rising upward from the ducts' outer walls to form a cover. The upper portion of the cover has vertical air trap walls, which form a grid conduit upon the base of which the grating is located. The main points are, that two parallel with one another extended coal ducts (3) are arranged at the bottom of the Grill-Unit, and that both coal ducts sit in between a vertical back wall (1) and a removable front wall (20) parallel to the vertical wall. By removing the front wall during operation of the unit, access to the inner portion of the unit is possible if desired, for example the grease trap tray (11) may be emptied, spices and sauces may be brought in, and as well the coals may be stirred about, since they are also layed out in the coal duct box-form, in a special design.

15 Claims, 2 Drawing Sheets

GRILL-UNIT USED MAINLY WITH CHARCOAL BURNING

BACKGROUND OF THE INVENTION

The present invention relates to a grill unit for use in the grilling of sausages, cutlets, chops, etc. On a grate over a charcoal fire.

Such types of units are already known in various configurations.

Most grill devices, whether built in the classical rectangular form, in a circular form, or even in a closed spherical form, dial with food to be grilled laying on a grate set directly above the grill briquets. Consequently the food is exposed to the heat and also often to the flame effects and flying ashes. Dripping fat particles, dropping on the glowing coals, give rise to carcinogenic elements which settle on the food. Moreover, the burning grease evolves intensely into a disagreeable oder which can be very offensive.

German Patent DD - PS 13 20 50 discloses a charcoal grill having a rectangular U-formed coal duct with vent holes on the sides is mounted on a foot supported frame. A grease collection tray is provided between the inner walls of the coal ducts, while on the outer walls of the coal ducts is mounted an air tight cover of pyramid form, that tapers upward. In the upper opening of the cover, between the vertical outer walls, a suspended grate is provided. All components are therefore advantageously loosely set together so that this grill unit may be easily disassembled. A special feature to be noted is that dripping grease from the grilled food does not fall onto the glowing coals, but rather into the grease trap tray laying under the grating. Thanks to the excellent chimney draft effect of the grill cover, the hot air is directed from the glowing coals to the roasting grid, where a good healthy roasting or grilling is possible. However, the disadvantage is that only by first lifting the grill cover can the burned out charcoal either be shoveled out or tipped out by tilting the coal duct from its foot mounted frame. The simple pouring out is, however, only possible if the grill has relatively small dimensions. As a result of shoveling out or tipping out the coal ashes there is a lot of dust and dirt. For cleaning the coal duct practically the complete grill must be taken apart, and the inner cover of the grill-Unit must be cleaned of soot which has been deposited on it. For grill units of large dimension there is the disadvantage that the access to the grill grid is not large enough, especially as regards the rear area. This is particularly a problem if the grill unit does not have a sufficient access from the back. Also, an emptying or filling of the grease trap is only possible after removal of the grill grid and subsequent lifting of the grill cover. While grilling, it is not possible, for example, without prior lifting of the grill grid and grill cover to add spices or flavoring to improve the taste of the grilled food. Moreover, the production of components of these conventional grill units is not possible in the best economical manner, since many sheet metal pieces must be cut out and fastened together.

SUMMARY OF THE INVENTION

The aim of the invention is to provide a grill unit of the above described type, which can be producted economically, with good handling manipulation, and preferably with good access to the grill's inner components, such as the coal duct and grease trap for simple cleaning procedures, and as well for loading and removing charcoal and ashes.

Accordingly there are two longitudinally extending coal ducts, essentially parallel to one another, positioned in the lower portion of the grill unit, whereby these two coal ducts are arranged between a vertical back wall and a parallel thereto front wall, which may be removed. This provides a very good accessibility to the grill grid, especially from the front, and there are also relatively large overall dimensions to the grill unit.

Via this design, according to the invention, there is the possibility to design the coal ducts together with the coordinated guide walls and air trap walls as a single unit, by which in each case a duct-cover-side piece can be built out of an essentially rectangular piece of sheet metal by simply bending and folding it into shape. Both of these duct-cover-side pieces, fundamentally identically formed and mirror invertedly placed, are firmly fastened to the level back wall with conventional fastening such as welding or similar methods so that they are air tight. Prevent unintentional deformation, especially of the duct inner walls, at least one cross support piece or a stiffening of the support form or of the lower wall form could be used at the height of the bend in the duct, there near the front wall. These could be welded together. With such a stiffening, the thickness of the sheet metal could be chosen to be somewhat thinner. In addition, there is at the same time an advantage if the vertical front wall is made to be removable on the vertical front portion of the duct-cover-side piece and to essentially have the external contour of the back wall and the side contours of the duct-cover-side pieces. Thereby with a simple removal of the door-like front wall, the whole inner compartment can be accessible while grilling, and the necessary hand movements be dealt with as desired and as needed inside. At intervals, the burning can thereby be regulated by adding, removing, or stirring around the glowing coals, the grease trap pan can be emptied or exchanged or according to need, flavoring and/,and, spices can be added, which can have a positive effect on the taste of the grilled food.

Nevertheless it is advantageous if the front wall can be either raised vertically or slid horizontally or detached, or with a corresponding combination of movements, be removed.

With the design of the front wall as a sliding wall, the sliding of the wall should preferably be in the slots, which can be provided for by the commensurate vertical edges of the front corners of the duct outer walls or of the front corners of the duct floor. Of course one must be careful with the cut out to have adequate material allowance for the wall and front edges. From its own weight therefore an advantageous sealing can be achieved between the front wall and the duct-cover-side pieces, since the side pieces on their front portion are slightly tilted upwards so that the front wall door presents a slightly backward sloping position. This slightly backwards tilting position of the front wall, aside from the automatic sealing also allows for a more secure operability of the horizontal and transverse sliding walls. Also, the front wall, held with magnetic or other fasteners, when detachable or when swinging outward on hinges toward the front, gives increased operational safety via this slight backward sloping.

For a good hand manipulation of the front wall, there is of course an advantage if at least one handle is provided, preferably on the outer surface. Depending upon whether it is planned to have a vertical or horizontal sliding wall or one a simple detachable wall or an outwardly swingable wall, then either one handle or two separated handles must be arranged on the corresponding side parts of the wall. For this, knob or grip handles as well as other utilitarian known handles may be used. It is important that slipping, even with damp or greasy hands or fingers, should be avoided.

As with the grill unit German patent DO - PS 13 20 50, the grill grid can be arranged to be inserted in the cover opening from above as so to be suspended. For this the rectangular expansive grill grid must essentially fill the complete cover opening and on both long sides there must be at least one suspension clasp, essentially U formed, of a straight base, so designed and formed that the base part in this suspended position practically encompasses the upper edge of the side air trap wall. In this way the suspended grid clasps can be designed so that after unhooking the grill grid from the grill unit, they can be swung underneath and bolted such that the grill grid can be placed in a parallel spaced flat position, or for example, because of drip protection, can in a proper way be placed directly on a tray.

According to the invention, on the side longitudinal supports in the area of the horizontal intersecting line between the sloping guide wall and the vertical air trap wall, the grill grid can also still be arranged to slide horizontally. For this the grill grid requires no suspended clasps, but rather uses adjustable feet on the underside as an optional practicality.

The ledge support structures for the grill grid can be used as welded on horizontal supports or as edge supports, formed during the folded edge forming of the duct-cover-side pieces, which would assure a particularly economic construction. By taking off or removal of the front wall, the grill grid can thereby either be lifted off or pulled out, or removed with a combination of both movements, whereby an especially good hand maneuverability is made available, and also for additional grill devices for lifting out, such as rakes, tongs, or similar items.

In an additional advantageous arrangement the coal ducts can be designed to be closed to open or partially open in the front, depending upon the construction of the front wall, the cover parts, or the duct inner parts.

An open duct construction in front, if safely made, offers the advantage that the coal or glowing coals cannot fall out forwards in an undesirable way. This falling out can be avoided if at least one partial front duct wall is arranged, or even better if in the duct a drawer for the coal is inserted or slid in. The drawer form, which is built essentially similar to an every day household baking tin, must of course have in the lower area on both sides of the long walls, air supply openings for the coal. Therefore the matching ducts should have correspondingly large enough air supply orifices, which reach up to the upper edge height of the drawer. In this way an essentially convenient and clean handling of the coal is assured since both drawers of the coal ducts can easily be pulled out forward, cleaned, loaded with coal, the coal ignited and brought to a glow, and then with optimum full glow can be slid into the coal duct. Right from the beginning then the grilling food can be layed on the grill without the worry that because of an inadequate glow of the coal that the quality of the grilling might be impared. Also, at intervals, without removing the grilling food out of the cover or that the cover must be removed, as required or successively one or the other of the drawers may be pulled out and the glowing coals stirred about, or even the exchange of one drawer for another with already prepared glowing coals may be made so that there is always one fully activated drawer still in the unit, so that the grilling food in the meantime doesn't cool off and thereby lose its grill quality. Herewith the box forms (drawers) can be inserted directly on the floor of the coal ducts and from here may be slid in and out. They could however, also be arranged to hang, slightly spaced above the coal duct floor, on horizontal side supports for sliding. These horizontal position supports could therefore be achieved either by welding of proportionate narrow struts or by use of folded over edge supports. For this the box forms must be so desiged that they have the corresponding lengthwise hanging lips. In particular in this track support design it is practical if also the duct floor has air supply openings, whereby an especially good air supply is assured for the coal box forms. For this, all four walls of the box form could have lengthwise air supply orifices or holes, but not the floor of the box form in order to avoid any trickling out of coal or ashes.

A further advantageous form could have both coal ducts from the front wall be closed with a panel, indeed up to their full height, whereby this panel goes continuously across and is applicable for both ducts. The back and front walls are then practically divided in two in there height, whereby the sloping guide walls together with the respective upper part of the front and back walls form a separate cover, which in a similar way, as is known from the DO - PS13 20 50 grill unit, can be sealed by setting it on the lower duct part. In this design there is a marked difference to be seen from conventional grill units, that the front and back sides are practically vertically formed, from which a good front and rear accessibility of the grill grid is assured.

This cover form, in imitation of the current state of the art, can be essentially U formed, so that the only difference to the conventional design is that the front side of the grill unit does not bulge out, but rather is smooth vertically, for better hand manipulation of the grill grid and the grilling food laying thereon.

According to the invention, the grill unit can be so constructed that it is either safely set on a support frame with at least three feet or arranged to be firmly suspended in a commensurate way.

In the construction with a support frame it is of course understood that for a secure mounting of this support frame, the frame will have three or four feet, whereby in each case the support frame must have vertical rabbit joints, which lightly encircle the grill unit from outside or between the ducts, or the ducts in the inner opening grasp the grill unit, to prevent the grill unit from sliding away.

With the suspended mounting of the grill unit, this can be accomplished by hanging with chains, cable or similar devices, whereby the required hook openings, eye hooks, or straps are provided for in the cover air trap walls or in the upper rim of the ducts.

There is also the possibility not to construct the duct-cover-side pieces as a single unit, but rather as duct outer wall-cover-side pieces, each of these welded individually to the back wall. Instead of the duct floor there are only several connecting rods or supports between the duct outer walls and the duct inner walls, in each case a duct or a long cross connecting rod which connects both duct outer walls and simultaneously the duct inner walls and at the same time bridges over the free space between the inner walls. Depending upon the design form, it is enough if at least two cross tie rods are available.

Finally it is also possible to have a design form with coal slide boxes, where the coal duct is completely omitted and merely a cover forming upper part used with corresponding slide supports on the under side of the coal box forms to be slid in from the front. In this way it could be imagined that the frame support itself is designed as the lower part of the slide support with an accommodation possibility for the grease trap pan. In this wasy the grill cover is practically reversed to the support frame, with the grease trap pan set on the slide in box form, whereby there is still the possibility to have a movable front wall especially for the removal of the grease trap pan and the grill grid.

A heating of the grill unit according to the invention, with electricity or gas can also be accomplished without difficulty. For this the required apparatus such as heating rods or gas burners can be placed directly in the coal duct.

The invention is more clearly described as follows, with reference to the drawings based on model designs.

DETAILED DESCRIPTION OF THE PREFERRED EMBODIMENTS

Figure 1:
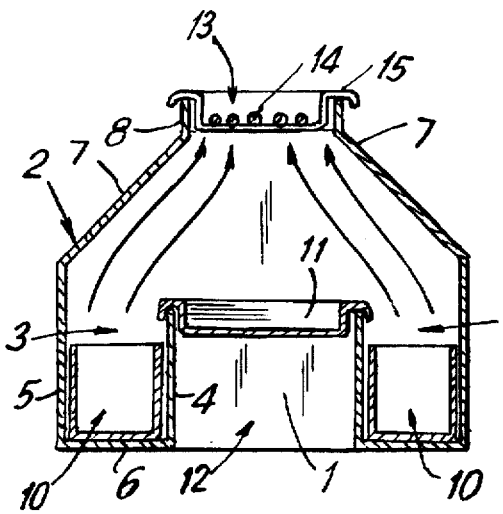
FIG. 1 is a schematic representation of a vertical cross section of a grill unit in the first embodiment with the coal box form placed on the coal duct floor.

The grill unit, according to the invention, in the first embodiment as shown in FIG. 1, essentially consists of a vertical back wall 1, to which on the front side, two essentially mirror inverted formed and arranged duct-cover-side pieces 2 are welded or otherwise fastened. The side pieces 2 in the embodiment shown in FIG. 1, in each case individually formed by bending of the sheet metal parts, consist essentially of a U formed cross section coal duct 3, whose sides have a vertical inner wall 4 and a parallel thereto outer wall 5. The walls 4, 5 are connected to one another by a horizontal duct bottom 6. On the upper edge of the duct outer wall 5 an inclined guide wall 7 closes it, which in turn continues upward into a vertical air trap wall 8 of a relatively short height.

In each case the coal box form 10 for reception of the coal is inserted in the coal duct 3, and stands on the duct floor. Of course the coal can also be brought directly to the coal duct 3. Between both duct inner walls 4 there is a grease trap tray 11 supported or rather arranged to be slid along the edges of the duct spacing area 12, formed between the inner walls 4, the back wall 1, and the front wall, which essentially closes tightly upwards.

Through the short side air trap walls 8 and through the corresponding upper section of the back wall 1 and the front wall 20 a grid conduit 13 is formed, which is a type of cover opening. In this grid conduit 13 a grill grid 14 is developed to be hooked on to a side support clasp 15, so that it is arranged to be at essentially the same interconnection level between the guide wall 7 and the air trap wall 8. It should be noted that the placement and the measurements of the coal ducts 3 as well as the corresponding duct inner walls 4 and thereby also the grease trap tray 11 are so dealt with that the grill grid 14 is somewhat narrower than the tray 11. Consequently the dripping moisture and grease from the grilling food laying on the grill grid 14 can always only drop into the trap tray 11 and not in the coal duct 3 or the glowing coals in the inserted box form 10. The rising hot air from the glowing coals in the coal duct 3 is proportionately concentrated by the form of the guide wall 7 and the air opening or hole in the lower area of the coal ducts 3 into a chimney effect and drawn to the grilling food laying on the grill grid 14 through the grid conduit 13.

Figure 2:
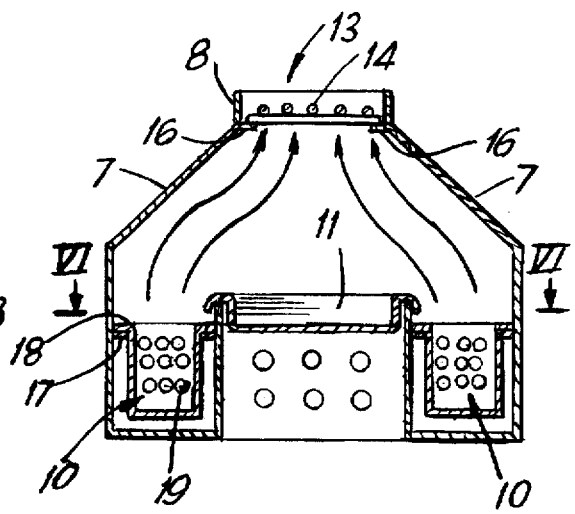
FIG. 2 is a section as in FIG. 1 of a second embodiment of the inventive grill unit, with a slide in suspended box form on a hanging slide support.

In the description of the embodiment in FIG. 2, this is a variation from the construction shown in FIG. 1. The important difference lies in that with duct-cover-side pieces 2, horizontal bearing supports 16 and 18 are used, which in each case project inwardly.

The bearing supports 16, essentially at the height of the transverse edge are used between the guide walls 7 and the air trap wall 8. The supports serve as support against direct, front, and back shifting of the grill grid 14.

Both of the seat support blocks 17 used in the coal duct 3 serve to support the slid hang lips of the box form 10. The box form 10 provides, on its part, the hang lips used for sliding along the horizontal bearing support 18. Thereby the placement of support 17 is so brought into line with the top of box form 10 that the floor of the box form 10 is at least slightly spaced away from the duct floor 8, and in this way good air circulation results. The box form 10 has, at least on its lower sides, air vents 19 in its perforated walls, through which fresh air penetrates for the glowing coals, also coming in from air vents in the coal ducts, although not shown in FIG. 1.

Figure 3:
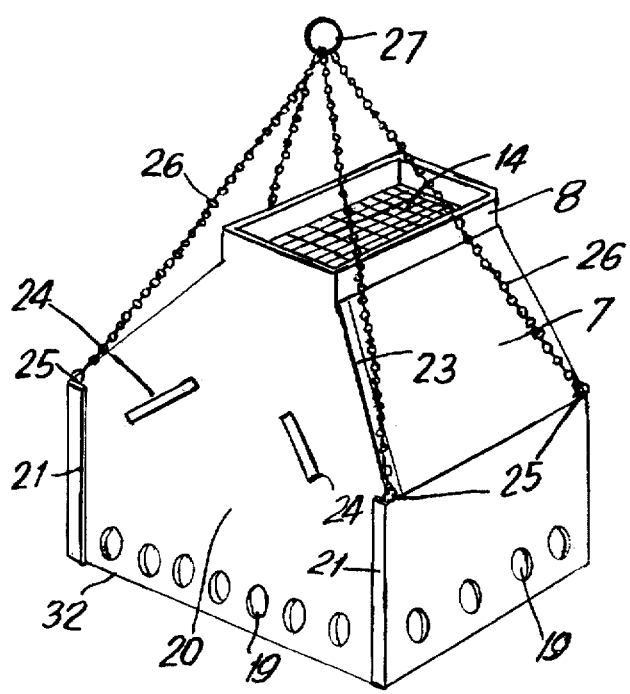
FIG. 3 is a perspective view of a grill unit, represented in FIG. 1 and 2 with hanging arrangements.

From the perspective drawing as shown in FIG. 3, the essential outer shape of the Grill-Unit according to FIGS. 1 and 2 can be observed. In particular it is evident that a front wall 20 is provided, which is essentially vertical and thereby arranged to be parallel to the back wall 1. In the embodiment shown in FIG. 3 the front wall 20 can be slid vertically in vertical slots 22 reinforced by the vertical supports 21 (see also FIG. 8). The front wall 20 has sloping roof forming support edges 23, whose slope coincides with that of the guide walls, which continue out of the wall level vertically and leaning to the back serve for sealing and as termination supports for the guide walls. Two handles 24 are provided, which serve the front wall for good hand manipulation and each has an appropriate form and construction.

As also to be noted from FIG. 3, on the four outer corners of the unit, at essentially the height of the transition between the duct outer walls and the guide walls 7, eye hooks 25 are provided for which chains 26 can be hung, which in turn is held together by the ring 27, which can be hung from a hook. The chains or cable 28 can each have a ring 27 and as required can be hung from one or more hooks.

Especially it should be noted in FIGS. 2 and 3 that by removal of the front wall 20 an excellent access to the entire inner chamber of the unit may be obtained. In this manner, as is especially to be seen in FIG. 2, the grill grid 14, both box forms 10 and also the grease trap pan 11 are arranged to slid both forward and backward, and as required these pieces may be individually removed or put in, without disturbing the functioning of the other parts. For example, the grease trap tray 11 can be removed or spices and flavoring brought in. Also with the box form 10, when the glow of the coals is diminished a newly prepared box form with good glowing coals can be exchanged for the old one.

Figure 4:
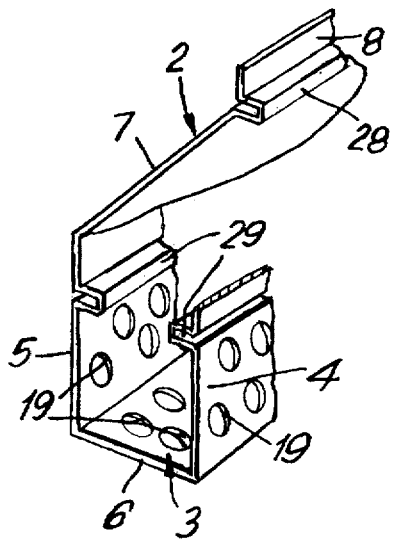
FIG. 4 is a partial perspective view of a cover-duct-side piece with folded edge supports embodiment in FIG. 2.

With the embodiment of FIG. 2, the seat support blocks 16 and 17 are formed by welding on narrow supports to the corresponding walls. These supports can nevertheless also be formed during the edge forming of the duct-cover-side pieces 2, where directly formed folded-over supports 28, 29 are found. Hereby the additional work of welding the supports can be avoided. From FIG. 4 it can also be seen that as well as the inner wall 4, the outer wall 5, and also the floor 6 of the coal duct, 3 can be provided with air vents 19.

Figure 5:
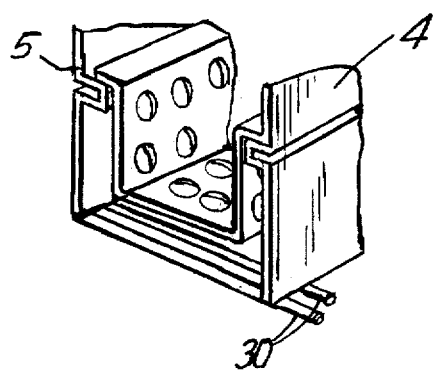
FIG. 5 is a detailed view of a coal duct with a suspended box form, of an additional embodiment.

In FIG. 5 there is an additional design possibility shown of the coal ducts. Here the inner wall 4 is not made in one piece with the outer wall 5 joined by a floor, but rather the connection of both pieces is accomplished with a cross rod which has the whole cross dimension of the unit and thereby it reaches from the outer wall of one duct to the outer wall of the other duct.

This transverse rod 30 could be a round rod or a flat support and could be provided in any desire number, for example only two or three pieces. In this embodiment the use of air vents in the duct walls is not necessary.

Figure 6:
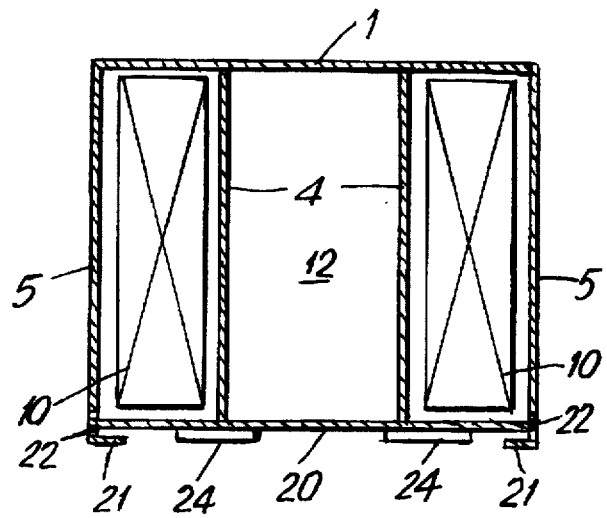
FIG. 6 is a sectional view VI—VI of FIG. 2 showing the arrangement of the walls and coal ducts.

FIG. 6 shows the arrangement of duct walls 4 and 5, the back wall 1 and the front wall 20 as well as both box forms 10 inserted in the ducts.

Figure 7:
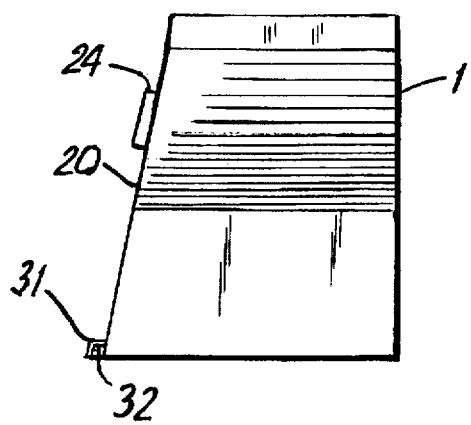
FIG. 7 is a side view of the grill unit represented in FIGS. 1 through 6, in a design with a slightly inclined front wall sloping toward the back and a lower horizontal slide support.

FIG. 7 is illustrative of a grill unit in the design form shown in FIGS. 1 through 6, still with an additional special feature. Here the front wall 20 is not vertical as in the previous designs and therefore arranged parallel to back wall 1, but is rather inclined toward the back. Therefore the front wall 20 is not laterally but rather via the lower edge led to the shown horizontal slot 32 through a horizontal support 31. This support 31 can be formed through pressure bending/ edging of a surplus piece of sheet metal projecting out of the duct floor. For opening the unit the sloping front wall 20 can be simply shoved horizontally with the handle 24 or can be lightly pulled up vertically out of the slot 32. This has the advantage that essentially from its own weight it lays on the front edges of the duct-cover-side pieces 2. Additionally for safety purposes, although not shown here, it could have a magnetic fastener, clasps or similar fastenings.

Figure 8:
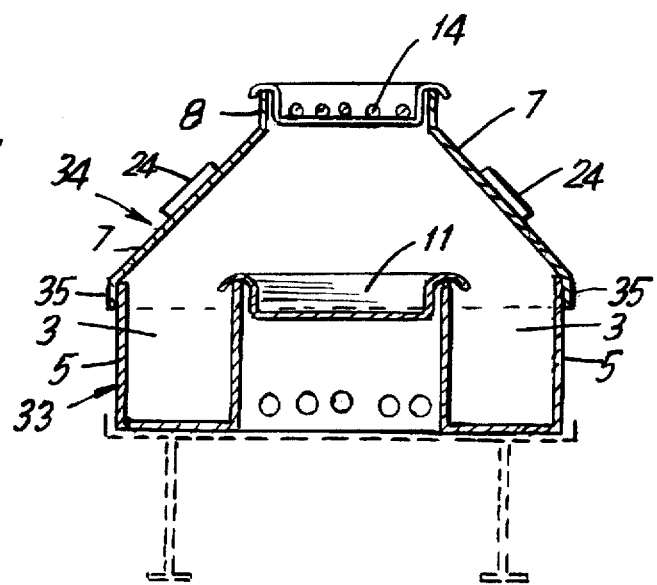
FIG. 8 is a cross sectional view of a grill unit in a third embodiment, with a separate duct lower part and the upper part of the cover.

In the FIG. 8 a further embodiment in which of both coal ducts 3 are closed together to the duct lower piece 33 is shown, which in each case have a back lower piece and a front wall under piece, essentially shown at the same height as the duct outer wall 5, which are firmly welded together to the respective walls and to the duct floor. The cover upper piece 34 is formed together via the guide walls 7, the air trap walls 8 and the corresponding back and front wall pieces. For a safe placement and at the same time a good seal of the upper and lower parts, an encompassing rim 35 goes around the cover upper piece 34 and the outer wall of the lower part 33. With this design form the coal is brought directly in the duct 33 and in each case the cover upper part 34 must be raised in order to load the coal, remove the ashes end to take in or out the grate trap pan 11, as in the introductory description of conventional grill units.

The unit arranged to have a mounting frame 37 set on at least three legs 36, such that here still, by way of suggestion, is marked the continuous shape.

We claim:

1. A grill unit, comprising: a vertical back wall; a front wall, two side pieces forming two parallel coal ducts arranged to extend between the front wall and the back wall, each of the coal ducts having a U-shaped cross-section with inner walls and outer walls having lateral vent holes therein, means for removably mounting the front wall to the side pieces; a grease trap tray supported on the inner walls; said two side pieces including an upwardly tapered cover above the outer walls, the cover having a top end; and, said two side pieces including vertical air trap walls arranged at the top end of the cover so as to form a grate opening with the front and back walls.

2. A grill unit according to claim 1, wherein the outer walls of the coal ducts are fixed to the back wall.

3. A grill unit according to claim 2, wherein the outer walls have front corners formed with vertical slots, the front wall being slideably arranged in the vertical slots of the outer walls.

4. A grill unit according to claim 3, wherein the front wall has a rearwardly projecting support piece that projects from the front wall at a right angle and is engageable with the cover.

5. A grill unit according to claim 2, wherein each of the coal ducts has a lower horizontal slot that extends between the inner wall and the outer wall, the front wall being horizontally slideable in the slots.

6. A grill unit according to claim 3, and further comprising a handle mounted on an outer surface of the front wall.

7. A grill unit according to claim 1, and further comprising an inwardly projecting, essentially horizontal support block in a transition area between the top end of the tapered cover and the vertical air trap walls, and a grill grid arranged on the support block.

8. A grill unit according to claim 1, wherein the coal ducts are configured to be open toward the front wall, and further comprising a separate coal box arranged in each of the coal ducts, each coal box having lateral vent holes, the coal boxes being slideable into the coal ducts from the front, each of the coal boxes having an upper outer edge that extends horizontally.

9. A grill unit according to claim 8, wherein each of the coal ducts has a floor between the inner and outer walls, the coal boxes being configured to sit on a respective duct floor.

10. A grill unit according to claim 8, wherein each of the coal ducts has a floor between the inner and outer walls, and further comprising slide support seats arranged inside the coal duct walls, the outer edges of the coal boxes being supported on the slide support seats of a respective coal duct so that a bottom of the coal box is slightly spaced above the coal duct floor.

11. A grill unit according to claim 7, wherein the support block is welded to the transition area.

12. A grill unit according to claim 7, wherein the support block is formed by a folded edge of the cover and the air trap walls.

13. A grill unit according to claim 10, wherein air vents are provided in the duct floors and the duct walls up to a height of the support seats.

14. A grill unit according to claim 1, and further comprising a mounting frame having at least three legs, the mounting frame being configured to support a bottom of the coal ducts.

15. A grill unit according to claim 1, and further comprising means for hanging the grill unit.

* * * * *